(12) United States Patent
van de Sanden

(10) Patent No.: US 9,808,887 B2
(45) Date of Patent: Nov. 7, 2017

(54) ASSEMBLY WITH WELD JOINT FORMED IN HYBRID WELDING PROCESS

(71) Applicant: AKTIEBOLAGET SKF, Göteborg (SE)

(72) Inventor: John F. van de Sanden, Nieuwegein (NL)

(73) Assignee: AKTIEBOLAGET SKF, Gothenberg (SE)

(*) Notice: Subject to any disclaimer, the term of this patent is extended or adjusted under 35 U.S.C. 154(b) by 320 days.

(21) Appl. No.: 14/376,066

(22) PCT Filed: Jan. 25, 2013

(86) PCT No.: PCT/EP2013/051468
§ 371 (c)(1),
(2) Date: Jul. 31, 2014

(87) PCT Pub. No.: WO2013/113630
PCT Pub. Date: Aug. 8, 2013

(65) Prior Publication Data
US 2014/0377586 A1    Dec. 25, 2014

(30) Foreign Application Priority Data
Jan. 31, 2012  (EP) ................. 2012/051542

(51) Int. Cl.
*B23K 26/00*  (2014.01)
*B23K 26/14*  (2014.01)
(Continued)

(52) U.S. Cl.
CPC .......... *B23K 26/1429* (2013.01); *B23K 26/32* (2013.01); *B23K 35/004* (2013.01);
(Continued)

(58) Field of Classification Search
CPC .............. B23K 35/004; B23K 35/0261; B23K 26/1429; B23K 35/3033; B23K 26/32; B23K 35/0288
(Continued)

(56) References Cited

U.S. PATENT DOCUMENTS 4,527,040 A * 7/1985 Moon ................. B23K 35/304
219/118
5,859,402 A    1/1999 Maier
(Continued)

FOREIGN PATENT DOCUMENTS

| DE | 102006021911 A1 | 11/2007 |
| JP | 2002346777 A | 12/2002 |
| JP | 2008284588 A | 11/2008 |

*Primary Examiner* — Phuong Nguyen
(74) *Attorney, Agent, or Firm* — Bryan Peckjian; SKF USA Inc. Patent Dept.

(57) ABSTRACT

An assembly includes a first steel component that is joined to a second steel component by a weld joint formed in a hybrid welding process. At least one of the first and second steel components is a through-hardened bearing steel. In the hybrid welding process, base material of the first and second steel components is melted, and a molten filler material including at least 90% nickel is added. The weld joint is formed after solidification of the molten base material and of the molten filler material. The weld joint has a central solidified portion and a peripheral solidified portion, and the central solidified portion includes at least 80% filler material and the peripheral solidified portion includes no more than 20% filler material.

20 Claims, 4 Drawing Sheets

(51) Int. Cl.
  *B23K 35/30* (2006.01)
  *F16C 43/04* (2006.01)
  *F16C 33/60* (2006.01)
  *B23K 35/00* (2006.01)
  *B23K 35/02* (2006.01)
  *B23K 26/32* (2014.01)
  *F16C 19/18* (2006.01)
  *B23K 103/00* (2006.01)

(52) U.S. Cl.
  CPC ...... *B23K 35/0261* (2013.01); *B23K 35/0288* (2013.01); *B23K 35/3033* (2013.01); *F16C 33/60* (2013.01); *F16C 43/04* (2013.01); *B23K 2203/50* (2015.10); *F16C 19/186* (2013.01); *F16C 2226/36* (2013.01); *F16C 2326/02* (2013.01); *Y10T 428/12937* (2015.01)

(58) Field of Classification Search
  USPC ...... 219/74, 121.11, 121.13, 121.14, 121.16, 219/121.63, 121.64, 121.65
  See application file for complete search history.

(56) References Cited

U.S. PATENT DOCUMENTS

| | | | |
|---|---|---|---|
| 6,589,671 B1* | 7/2003 | Kehrer | B23K 15/0073 219/121.11 |
| 2001/0030224 A1 | 10/2001 | Eulenstein et al. | |
| 2004/0000539 A1 | 1/2004 | Takikawa et al. | |
| 2010/0251810 A1* | 10/2010 | Mol | F16C 33/62 73/114.81 |
| 2010/0276402 A1* | 11/2010 | Richard et al. | B23K 9/0286 219/121.64 |
| 2010/0296764 A1* | 11/2010 | Strandell | C21D 1/10 384/625 |

* cited by examiner

ASSEMBLY WITH WELD JOINT FORMED IN HYBRID WELDING PROCESS

CROSS REFERENCE TO RELATED APPLICATION

This is a National Stage application claiming the benefit of International Application Number PCT/EP2013/051468 filed on 25 Jan. 2013 (25 Jan. 2013), which claims the benefit of International Application Number PCT/EP2012/051542 filed on 31 Jan. 2012 (31 Jan. 2012), both of which are incorporated herein by reference in their entireties.

FIELD OF THE INVENTION

The present invention relates to an assembly comprising a first steel component joined to a second steel component by means of a weld joint formed in a hybrid welding process, whereby at least one of the first and second steel components comprises hardened bearing steel. The invention further relates to a method of forming the weld joint.

BACKGROUND TO THE INVENTION

Hybrid welding is a process in which the techniques of energy beam welding and gas metal arc welding (GMAW) are combined. As a result, the high speed and large penetration depth associated with e.g. laser welding can be obtained at the same time as the excellent gap-bridging capabilities associated with GMAW. Hybrid welding is widely applied to join together steel parts. However, when one or both of the steel parts are made of a hardened steel with a high carbon content, i.e. greater than 0.4% C, welding is more problematic. The melting of the weld materials and overheating of the materials next to the weld (Heat Affected Zone (HAZ)) can result in unwanted phase transformations, leading to over-hardening and possibly cracking.

A weld joint formed in a hybrid welding process applicable to hardened metal parts is disclosed in DE 102006021911. The joint is formed by injecting energies from carbon dioxide laser welding and metal protective gas welding into a common process zone, and supplying a welding filler material into a welding bath melted by the welding process. The arc welding energy source foreruns the laser welding energy source by about 2-10 mm. The welding filler material, AWS standard ER NiCr-3, is supplied in form of wire with diameter of 0.8-1.2 mm and with a feed speed of 5-22 m/min. In one embodiment, at least one of the parts is made of a case-hardened steel with a carbon content of 0.5-1.0% and a hardening depth of 0.1 to 1.2 mm.

There is still room for improvement, however, in terms of providing a weld joint that is suitable for through-hardened bearing steel.

SUMMARY OF THE INVENTION

The present invention resides in an assembly comprising a first steel component that is joined to a second steel component by a weld joint formed in a hybrid welding process, whereby at least one of the first and second steel components comprises a through-hardened bearing steel. In the hybrid welding process, base material of the first and second steel components is melted and a molten filler material comprising at least 90% Nickel is added. The weld joint is formed after solidification of the molten base material and the molten filler material. According to the invention, the weld joint comprises a central solidified portion and a peripheral solidified portion, whereby the central solidified portion comprises at least 80% filler material and the peripheral solidified portion comprises no more than 20% filler material.

In other words, the weld joint is formed with only a minimal amount of mixing between the filler material and the base material of the first and second steel components. The present inventor has found that a weld joint thus formed has excellent strength and toughness. Furthermore, the heat affected zone (HAZ) associated with the weld joint does not lead to an unacceptable increase in hardness, which would compromise the fracture toughness of the bearing steel.

The through hardened bearing steel is a bearing steel as defined in Section 2a of "Key to Steel" [22nd edition, Verlag Stahlschlüssel Wegst GmbH], whereby the bearing steel is subjected to martensitic hardening treatment or a bainitic hardening treatment. In one embodiment of the invention, both the first and second components are made of through-hardened bearing steel. In a second embodiment, only one of the first and second components is made from through-hardened bearing steel. The other of the first and the first component may be made from any steel. In a preferred example of the second embodiment, the first component is a through-hardened separate inner ring and the second component is a flanged hub of a wheel bearing unit. The flanged hub is made from a bearing steel as defined above, whereby the section that is welded to the separate inner ring is unhardened.

In use, the separate inner ring and the flanged hub of the wheel bearing unit experience high static and dynamic loads. The weld joint must be able to withstand these loads and, after welding, the components must be able to withstand the loads without fracturing. This is achieved through the use of a Nickel filler material and by suitably adapting the hybrid welding process, which will be explained in more detail below.

The Nickel filler material provides good weld strength and toughness, and also creates a good interface between the molten weld pool and the base material(s).

The filler material may additionally comprise e.g. 2% titanium, which gives added strength. Other alloying elements such as boron and chromium may also be added to the Nickel filler.

The present invention also defines a method of hybrid welding, so as to form a weld joint as described above. The hybrid welding combines energy beam welding with gas metal arc welding. Suitably, the energy beam is a laser beam or an electron beam and the metal arc welding technique employs an inert gas and a filler wire that comprises at least 90% Nickel. In the method of the invention, the energy beam foreruns the metal arc. The energy beam is directed at a contact interface between the first and second components, which melts the steel base materials and creates a keyhole. The space between the first and second components is then filled with molten filler material. The welding process is controlled such that only heat from the energy beam melts the steel base materials and only heat from the metal arc torch melts the filler material.

The weld joint must possess sufficient strength, and therefore requires a certain depth. Depending on the application, the depth may lie between 2 mm and 10 mm. When the weld depth is greater than 3 mm, a groove is preferably provided at the contact interface between the first and second components. The groove may be a V-shaped groove, a U-shaped groove or other suitably shaped groove. The depth of the groove typically lies between 1 and 5 mm and is selected depending on the required weld depth. The maximum width of the groove is also selected to provide the weld joint with sufficient strength, and may lie between 2 and 6 mm.

The provision of a groove reduces the amount of steel that needs to be melted. If we assume that a weld depth of 7 mm is required and a groove with a depth of 4 mm (and a maximum width of 4.5 mm) is provided at the contact interface, the depth of the keyhole created by the energy beam only needs to be 3 mm. As a result, the amount of energy supplied from the energy beam is less likely to cause over-hardening in the HAZ. Furthermore, the power of the energy beam is selected depending on the depth of steel that needs to be melted, and is set as low as possible. Typically, the energy beam has a power of between 2000 and 7000 W.

When the keyhole is created by the energy beam, base material of the first and second components melts and is pushed out of the keyhole. Next, the arc process delivers molten filler material into the keyhole. The molten base material solidifies, due to heat conduction towards the solid base material, before the filler material solidifies. Minimal mixing occurs and, as a result, the final weld joint has a central solidified section that comprises at least 80% filler material and a peripheral solidified section that comprises no more than 20% filler material.

The step of controlling the process may further comprise: controlling the welding speed at between 10 and 30 mm/s; controlling a distance between the energy beam and the filler wire at between 2 and 5 mm; controlling a feed rate of the filler wire at between 3 and 25 m/min; controlling the power of the metal arc torch at between 80 and 200 Amps.

The method of the invention allows a component made of through hardened bearing steel to be welded to a second steel component in a straightforward process, which results in a strong weld joint and a minimal heat affected zone with an acceptable fracture toughness.

Further advantages of the present invention will become apparent from the following detailed description and accompanying drawings.

DESCRIPTION OF THE FIGURES

In the following, the invention is described with reference to the accompanying drawings, in which.

DETAILED DESCRIPTION

Figure 1:
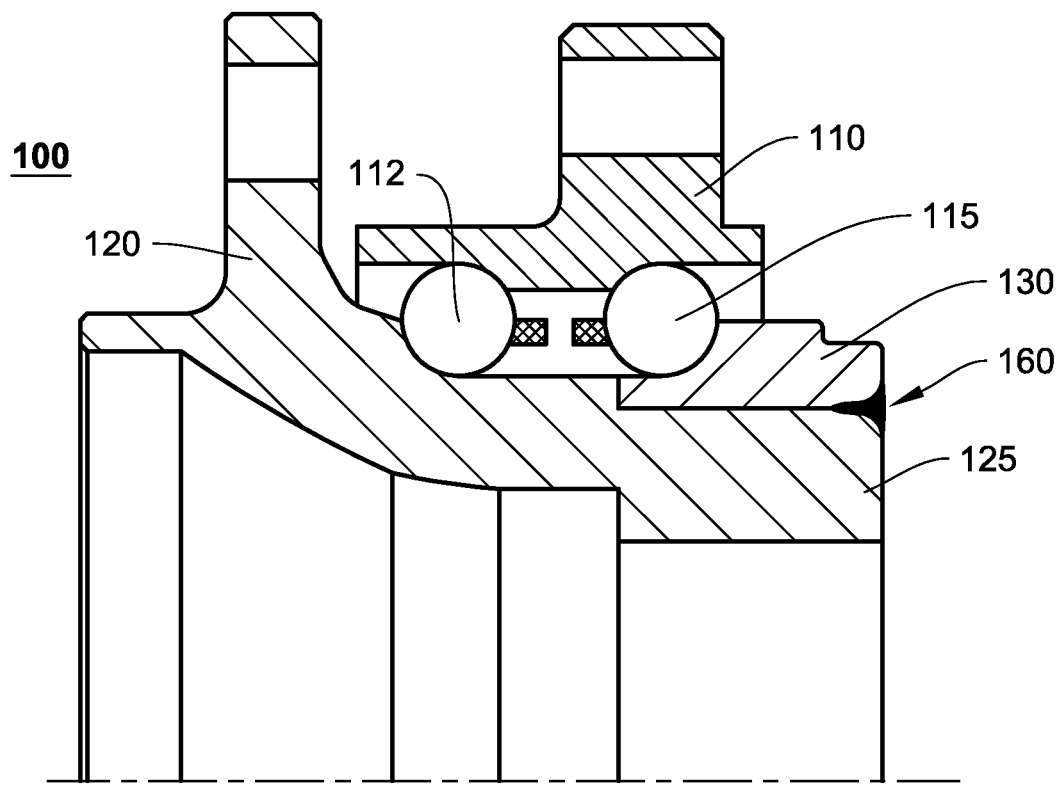
FIG. 1 shows a partial cross-sectional view of a bearing unit comprising a weld joint according to the invention.

An example of part of an assembly comprising a weld joint formed in accordance with the invention is shown in cross-section in FIG. 1. The assembly is a wheel bearing unit 100 having an outer ring 110 with first and second outer raceways for accommodating a first row 112 and a second row 115 of rolling elements. The bearing unit further comprises a flanged inner ring 120 which has a first inner raceway for the first row of rolling elements 112. The second inner raceway for the second row of rolling elements 115 is provided on a separate inner ring 130. The separate inner ring is necessary in order to allow the second row of rolling elements 115 to be inserted into the hub unit after the outer ring 110 has been mounted over the first row 112. The separate inner ring 130 is mounted on a nose part 125 of the flanged inner ring 120. The separate inner ring is made of through-hardened bearing steel and the flanged inner ring (and nose part) is made of a hardenable steel, whereby the first inner raceway is induction hardened to provide the necessary hardness for withstanding rolling contact fatigue.

In conventional hub units, the nose part comprises an axial extension, which is orbitally formed around the separate inner ring, to lock up the bearing unit and set the desired amount of preload. The required axial extension adds to the material costs and weight of the hub unit. Also, because the axial extension needs to be deformable, while other parts of the flanged inner ring need to be induction hardened, an inadvertent hardening of part of the axial extension can lead to cracking when the extension is orbitally formed.

These drawbacks are overcome according to the invention in that the separate inner ring 130 is welded to the nose part 125 by means of a weld joint 160 formed in a hybrid welding process which is specially adapted for steels with a high carbon content that have been through-hardened.

In use, the wheel bearing unit is subjected to high axial loads. The weld joint 160 must possess sufficient strength to withstand these loads, meaning that a relatively deep weld is needed. The problem of a deep weld when one of the components is made of through-hardened bearing steel is that the energy needed to melt the steel at the required depth causes phase transformations in the material next to the weld, i.e. the heat-affected zone (HAZ). In effect, the HAZ can become over-hardened, resulting in unacceptable fracture toughness. It is possible to improve weldability by applying pre-heating and/or post-heating, but this adds to the complexity of the process and may have an adverse effect on other parts of the assembly. In the bearing unit of FIG. 1, for example, the welding operation is one of the final steps in assembling the unit, and pre-/post-heating might degrade the grease lubricant within the bearing or the cage that retains the rolling elements.

The weld joint 160 of the present invention has a central solidified portion that predominantly consists of a Nickel filler material used in the welding process. The joint further has a peripheral solidified portion that substantially comprises steel and contains no more than 20% of the filler material. Such a joint has been found to provide sufficient strength, and may be formed according to a method that does not require pre-heating or post-heating, and which does not lead to over-hardening of the through-hardened bearing steel.

The method will be described with reference to FIGS. 2a-2d, which show a further example a weld joint according to the invention, in progressive stages of its formation. The weld joint is formed between a first component 201 and a second component 202. The first component is a bearing ring made of through hardened bearing steel and the second component may be a flanged hub made of hardenable steel, as described above.

The first component 201 is placed next to the second component 202, such that a contact interface 205 is defined between the two components. Next, a groove 210 is optionally provided at the contact interface 205. The groove is provided when the weld joint needs to have a depth of greater than 3 mm. The groove 210 is formed by removing material from the first and second components 201, 202, which creates a first groove face 211 on the first component and a second groove face 212 on the second component. In the depicted example, the groove 210 is V-shaped and has a depth dg of approximately 3 mm and a maximum width wg of approximately 3.5 mm. Other groove shapes are possible.

Figure 2A:
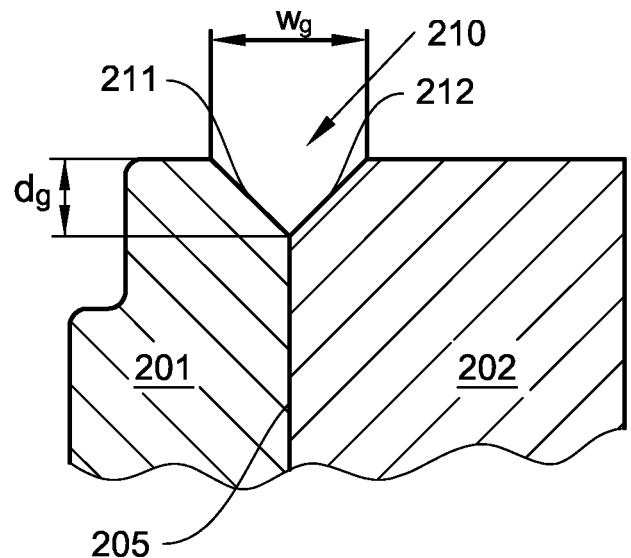
FIGS. 2a-2d show partial cross-sectional views of a first steel component and a second steel component, during the formation of a weld joint according to the invention.
Figure 2E:
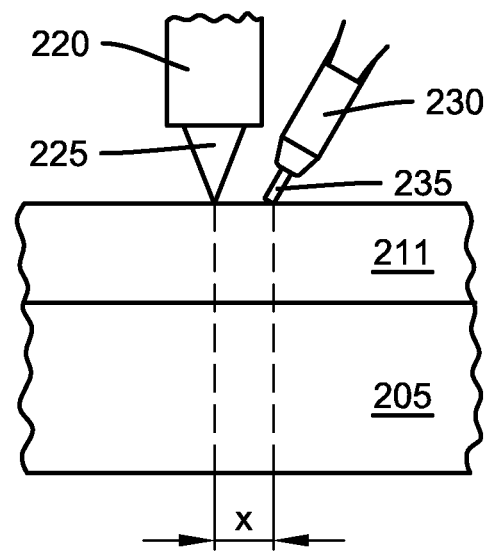
FIG. 2e schematically depicts a welding arrangement relative to a cross-section through a first component along a contact interface.

The weld joint is formed in a hybrid welding process, whereby the welding arrangement comprises a first energy source in the form of a laser beam and a second energy source in the form of a metal arc from a gas metal arc (GMA) torch. The welding arrangement is schematically depicted in FIG. 2e, relative to a cross-section through the first component 201 along the contact interface 205. In this example, the laser 220 is a 4 kW Nd:YAG laser. The laser beam 225 has a focal length of 200 mm and a spot size of 0.6 mm. The GMA torch 230 has a filler wire 235 made of a Nickel material, which forms the metal arc on contact with the base material. The process gas is Argon. The wire feed rate is set at 3.8 m/min. Furthermore, the welding arrangement is set up such that the laser beam 225 and the filler wire 235 are separated by a distance x of approximately 3 mm, whereby the laser beam foreruns the filler wire.

In this example, a welding speed of 26 mm/s and a power of 3 KW are used. The filler wire has a diameter of 1.2 mm and is supplied at a feed rate of 7.5 m/min. The first component is made of SAE 52100 bearing steel (through-hardened), which will be designated as material A. The second component 202 is made of SAE 1070 bearing steel, which will be designated as material B. The filler wire comprises 95% Nickel and 2% titanium, and will be designated as material C.

Figure 2B:
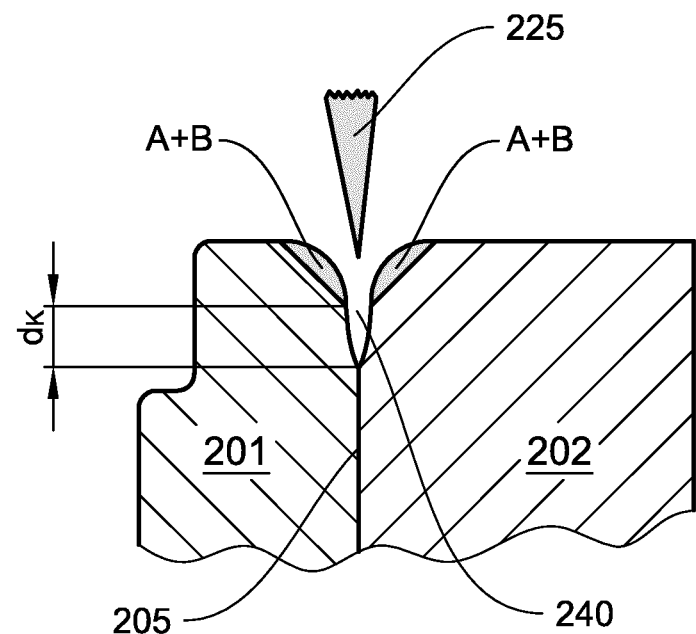

As mentioned, the laser beam foreruns the metal arc. When the laser beam 225 is directed at the contact interface 205 between the first and second components, a keyhole is created, as shown in FIG. 2b. The keyhole 240 has a depth dk of approximately 3 mm and a width of approximately 1.5 mm. In creating the keyhole 140, the laser beam melts a small amount of material A and material B, in essentially equal quantities. A molten mixture of A+B is formed, which flows into the groove at the first groove face 211 and at the second groove face 212. Radiated heat from the laser beam also melts a small amount of material A at the first groove face 211 and a small amount of material B at the second groove face 212. Thus, a first melt pool is created at the first groove face and a second melt pool is created at the second groove face, whereby the first melt pool contains relatively more material A than the second melt pool. Suitably, the first and second melt pools have a depth of no more than 0.5 mm. After melting, the mixtures of A+B in the first and second melt pools start to solidify, due to heat condition to the first component 201 and to the second component 202.

Figure 2C:
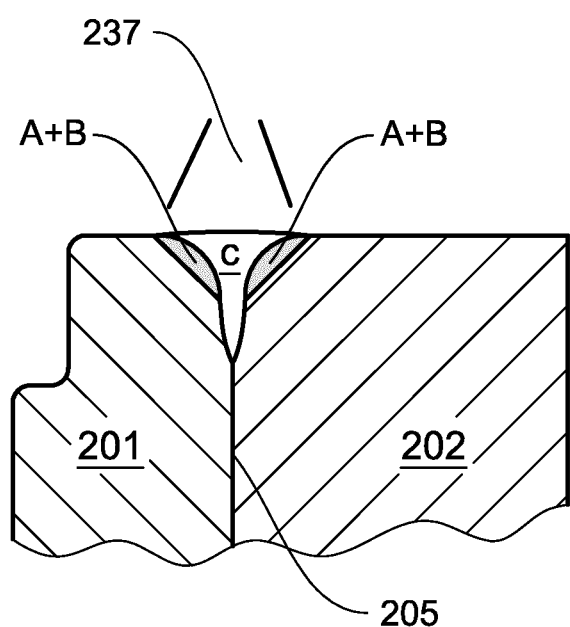

In a next step, the filler wire is fed into the groove and makes contact with the weld pools, thereby creating a metal arc, as shown in FIG. 2c. Heat from the metal arc 237 melts the filler wire and molten material C is injected into the keyhole and groove. When molten material C makes contact with the solidifying mixture of A+B on the first and second groove faces, only a small amount of mixing takes place. This is due to the fact that the first and second melt pools have a superficial depth (of less than 0.5 mm), meaning that the molten combination of materials A, B and C mostly comprises material C. Furthermore, the molten combination is dominated by electromagnetic stresses, caused by electric divergence of the electric current from the arc, which results in a Lorentz type B circulating flow in the molten combination of A, B and C. This type of flow is a circulating current, flowing inwards (towards the centre of the weld pool) and then downwards to the bottom of the keyhole. Material C has a much lower melting temperature (around 1070° C.) than that of the mixture of A+B (around 1600° C.). Due to geometrical constraints, heat is trapped at the centre of the weld, while solidification starts from the first and second groove faces. Consequently, a central portion of the weld predominantly comprises material C. At peripheral portions of the weld, the majority of the mixture of A+B solidifies before much circulation together with material C has taken place. In other words, at the peripheral portions, relatively little intermixing has taken place.

Figure 2D:
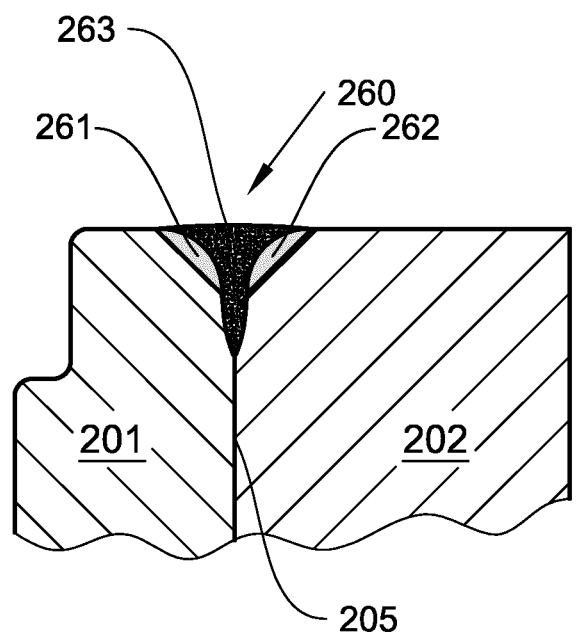

The final weld joint is formed when the filler material solidifies, as depicted in FIG. 2d. The central portion 263 of the weld joint 260 comprises at least 80% filler material (material C), while each of the peripheral portions 261, 262 comprises no more than 20% filler material.

A number of weld joints were formed using components and equipment as described above. In a second example, the laser power was set at 2000 W, the welding speed was set at 17 mm/s and the wire feed rate at 5 m/min. In a third example, the laser power was 3000 W, the welding speed was 26 mm/s and the wire feed rate was 7.5 m/min.

The hardness of the weld joint and the heat affected zone was measured, and in each case the maximum hardness in the HAZ of the material with the highest carbon content (SAE52100) was less than 970 HV, which is acceptable for bearing applications. Furthermore, a push-out test was performed on each of the joints. An average force of around 320 kN was required to separate the welded components from each other, which is well above the maximum forces which are expected in use of a wheel bearing.

A number of aspects/embodiments of the invention have been described. It is to be understood that each aspect/embodiment may be combined with any other aspect/embodiment. Moreover the invention is not restricted to the described embodiments, but may be varied within the scope of the accompanying patent claims.

The invention claimed is:

1. An assembly comprising a first steel component that is joined to a second steel component by a weld joint formed in a hybrid welding process, wherein at least one of the first and second steel components comprises a through-hardened bearing steel, and wherein the hybrid welding process comprises melting base material of the first and second steel components and adding a moulten filler material comprising at least 90% Nickel, the weld joint being formed after solidification of the moulten base material and the moulten filler material,
   wherein, the weld joint comprises a central solidified portion and a peripheral solidified portion, whereby the central solidified portion comprises at least 80% filler material and the peripheral solidified portion comprises no more than 20% filler material.

2. The assembly according to claim 1, wherein the filler material comprises at least 95% Nickel.

3. The assembly according to claim 1, wherein the first component and the second component comprise bearing steel.

4. The assembly according to any preceding claim, wherein the through-hardened bearing steel component is a bearing ring of a rolling element bearing.

5. A method of forming a weld joint between a first steel component and a second steel component in a hybrid welding process, wherein:
   at least one of the first and second steel components comprises a through-hardened bearing steel, and the hybrid welding process combines:
   a first energy source in the form of a laser beam or an electron beam, and a second energy source from a gas metal arc welding process in which a filler wire comprising at least 90% Nickel is employed as a filler material, wherein the method comprises steps of:
- directing the first energy source at a contact interface between the first and second steel components to create a keyhole, whereby material of the first steel component and material of the second component melt to form a moulten steel mix;
- injecting moulten filler material into the keyhole, via the arc welding process, the weld joint being formed after solidification of the moulten steel mix and of the moulten filler material; and
- controlling the hybrid welding process such that the first energy source foreruns the second energy source and such that, after solidification of the moulten materials, the weld joint has a central solidified portion comprising at least 80% filler material and has a peripheral solidified portion comprising no more than 20% of the filler material.

6. The method according to claim 5 wherein the weld joint has a depth of between 2 and 10 mm.

7. The method according to claim 6 wherein the weld joint has a depth greater than 3 mm and the method further comprising, prior to welding, a step of providing a groove at the contact interface between the first and second components.

8. The method according to claim 7 wherein the groove has a depth of between 1 and 5 mm.

9. The method according to claim 7 wherein the groove is V-shaped.

10. The method according to claim 5, wherein the step of controlling comprises setting the power of the first energy source at between 1000 and 7000 W.

11. The method according to claim 5, wherein the step of controlling comprises setting a distance at which the first energy source foreruns the second energy source at between 2 and 5 mm.

12. The method according to claim 5, wherein the step of controlling comprises setting the welding speed at between 10 and 30 mm/s.

13. The method according to claim 5, wherein the step of controlling comprises setting a wire feed rate of the filler wire at between 3 and 10 m/min.

14. The method according to claim 5,
wherein the step of controlling comprises setting the power of the first energy source at between 1000 and 7000 W and setting a distance at which the first energy source foreruns the second energy source at between 2 and 5 mm, and setting the welding speed at between 10 and 30 mm/s, and setting a wire feed rate of the filler wire at between 3 and 10 m/min.

15. The method according to claim 5, including:
- directing the first energy source along the contact interface at a speed between 10 and 30 mm/s;
- maintaining a distance between the laser beam or electron beam and the filler wire at the keyhole of between 2 and 5 mm;
- feeding the filler wire at between 3 and 25 m/min; and
- maintaining a power of the gas metal arc welding at between 80 and 200 Amps.

16. An assembly produced by the method according to claim 5.

17. A method of forming a weld joint by a hybrid welding process comprising:
a) placing a first steel component comprising a through-hardened bearing steel in contact with a second steel component at a contact interface;
b) directing a laser beam or electron beam along the contact interface to create a keyhole and form a molten steel mix comprising a portion of the first steel component and a portion of the second steel component,
c) after step b, performing a gas metal arc welding process along the keyhole using a filler wire comprising at least 90% nickel to inject molten filler material into the keyhole such that the molten filler material produced by the gas metal arc welding process partially mixes with the molten steel mix produced by the laser beam or the electron beam to form the weld joint and such that, after the mixture of the molten filler material and the molten steel mix solidifies, the solidified mixture has a central solidified portion comprising at least 80% filler material and a peripheral solidified portion comprising no more than 20% of the filler material.

18. An assembly produced by the method according to claim 17.

19. The method according to claim 17 wherein the weld joint has a depth greater than 3 mm and the method further comprises, before step b, forming a groove at the contact interface.

20. The method according to claim 17, including:
- directing a laser beam or electron beam along the contact interface at a speed between 10 and 30 mm/s;
- maintaining a distance between the laser beam or electron beam and the filler wire at the keyhole of between 2 and 5 mm;
- feeding the filler wire at between 3 and 25 m/min; and
- maintaining a power of the gas metal arc welding at between 80 and 200 Amps.

\* \* \* \* \*